(12) United States Patent
Brantley et al.

(10) Patent No.: US 7,244,487 B2
(45) Date of Patent: Jul. 17, 2007

(54) APPARATUS, SYSTEM, AND METHOD OF JOINING STRUCTURAL COMPONENTS WITH A TAPERED TENSION BOND JOINT

(75) Inventors: Jerry W. Brantley, Fort Worth, TX (US); Charles Mark Rodenberger, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 164 days.

(21) Appl. No.: 10/986,548

(22) Filed: Nov. 11, 2004

(65) Prior Publication Data

US 2005/0064134 A1 Mar. 24, 2005

Related U.S. Application Data

(63) Continuation-in-part of application No. 10/422,254, filed on Apr. 24, 2003, now abandoned.

(51) Int. Cl.
*B32B 3/26* (2006.01)
(52) U.S. Cl. ............... 428/119; 244/123; 244/131; 403/265
(58) Field of Classification Search ............... 428/119; 52/729.1, 729.2; 244/131, 123; 403/265
See application file for complete search history.

(56) References Cited

U.S. PATENT DOCUMENTS

| | | | |
|---|---|---|---|
| 3,096,958 A | 7/1963 | Koontz | 244/123 |
| 4,113,910 A | 9/1978 | Loyd | 428/162 |
| 4,219,980 A | 9/1980 | Loyd | 52/309 |
| 4,331,723 A | 5/1982 | Hamm | 428/61 |
| 4,395,450 A | 7/1983 | Whitener | 428/116 |
| 4,452,657 A | 6/1984 | Hamm | 156/198 |
| 4,662,587 A | 5/1987 | Whitener | 244/117 R |
| 4,813,202 A | 3/1989 | Anderson | 52/285 |
| 4,893,964 A | 1/1990 | Anderson | 403/376 |
| 4,904,109 A | 2/1990 | Anderson | 403/374 |
| 6,173,925 B1 | 1/2001 | Mueller et al. | 244/219 |
| 6,237,873 B1 | 5/2001 | Amaoka et al. | 244/123 |
| 6,374,570 B1 | 4/2002 | McKague, Jr. | 52/762 |
| 6,520,706 B1 | 2/2003 | McKague, Jr. et al. | 403/265 |
| 6,676,882 B2 | 1/2004 | Benson et al. | 264/510 |
| 6,712,099 B2 | 3/2004 | Schmidt et al. | 139/383 R |
| 6,718,713 B2 | 4/2004 | McKague, Jr. et al. | 52/309.13 |

FOREIGN PATENT DOCUMENTS

WO WO 84/01128 3/1984

*Primary Examiner*—Alexander S. Thomas
(74) *Attorney, Agent, or Firm*—Bracewell & Giuliani LLP

(57) ABSTRACT

A system of composite and adhesive materials provides for a high strength, producible closeout joint in the form of tapered tension bond joint for high performance structures. The system includes one skin that is co-bonded to flat panel spars, with the joint being positioned at the opposite side of the spars. The spar includes a female receptacle that receives a male blade from the closeout skin assembly. The blade and receptacle are wedge-shaped woven preforms. The flat panel spars have imbedded nut elements that serve as "internal tooling" to provide a positive stop for locating and clamping the structural members together.

23 Claims, 6 Drawing Sheets

APPARATUS, SYSTEM, AND METHOD OF JOINING STRUCTURAL COMPONENTS WITH A TAPERED TENSION BOND JOINT

CROSS-REFERENCE TO RELATED APPLICATION

This application is a continuation-in-part of application Ser. No. 10/422,254, filed Apr. 24, 2003, now abandoned.

BACKGROUND OF THE INVENTION

TECHNICAL FIELD

The present invention relates in general to an improved joint for structural components, and in particular to an improved apparatus, system, and method for forming a tapered tension bond joint between structural components.

BACKGROUND OF THE INVENTION

Closeout panels can present problems for manufacturers, in that panels may attach to a substructure without access to the backside of the panel. In the past, these panels have been bolted to the substructure or attached using blind fasteners, such as pull rivets. These methods require expensive and time-consuming drilling and fastening operations and may weaken the structure. More recently, these panels have been co-bonded or secondarily bonded using resin or a thin layer of adhesive.

Typically, laminating resins are used as the matrix material in woven textiles, this also being true for woven preforms used to connect components made of composites or other materials. An example of a commonly used laminating resin is 977-3, available from Cytec Industries, Inc., of West Paterson, N.J. The laminating resin is infused into a textile product and is cured to form a polymer matrix in the finished composite component. When assembling a typical joint using a preform, the preform may be co-cured along with uncured composite components or the components may be cured prior to assembly using an uncured preform. Because of the inferior bonding characteristics of laminating resins, a thin layer of adhesive is often placed between the preform and the components. Generally, an adhesive film is used, which is expensive and adds to fabrication time.

To achieve proper bonding when using a thin layer of adhesive, such as an adhesive film, between pre-cured components, special attention must be paid to the interface at the adhesive layer. This bond line is critical, and, where two surfaces are brought together, the distance between the surfaces must be within a critical tolerance to ensure a proper bonding layer. The thickness of the adhesives is usually about 0.015" thick with a bond layer tolerance of +/−0.005". Methods for ensuring proper bonding may include tools, such as molds or vacuum bags, but particular applications may prevent the use of tools due to the inaccessibility of one or both sides of the joint. An example of this type of application is a closeout panel, such as the skin of a wing being bonded to an internal spar.

Z-pins have been used in joints connecting two composite, laminate components in the prior art. For example, U.S. Pat. Nos. 5,863,635, 5,968,639, and 5,980,665 to Childress discloses inserting z-pins into a first composite component to form stubble at a bonding face, then curing the first component. An uncured second component is then bonded to the first component with the stubble extending into and among the fibers of the second component and through the bond line.

Figures 1, 2, 3:
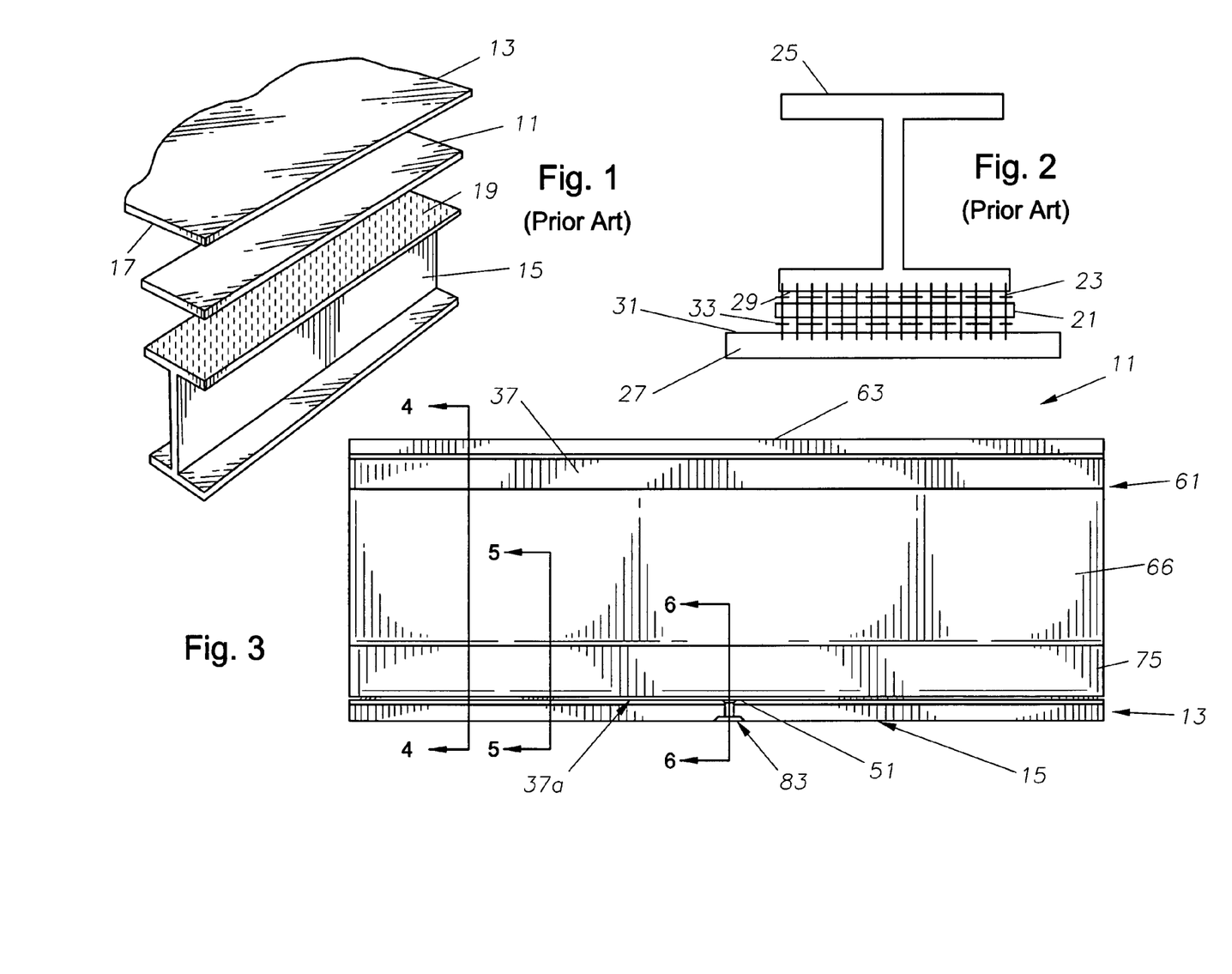
FIG. 1 is an exploded, perspective view of a prior art assembly using a padup strip and components having z-pin stubble.
FIG. 2 is a front view of a prior art assembly formed using a pre-cured strip to connect components, the pre-cured strip having z-pins extending from opposite sides.
FIG. 3 is a side view of one embodiment of a structure constructed in accordance with the present invention.

As shown in FIG. 1 and in the '635, '639, and '665 patents, an additional prior-art method includes inserting a padup strip 11 between two cured components 13, 15. Components 13, 15 are generally formed of plies of woven or unidirectional fibers and a resin matrix and are cured with a Z-pin stubble extending from surfaces 17, 19. Padup strip 11, which is typically formed of the same materials as components 13, 15 or formed of a pure adhesive material without fiber reinforcement, is uncured during assembly. Components are assembled with padup strip 11 between surfaces 17, 19, the z-pin stubble fields extending into padup strip 11. The resin in padup strip 11 is then cured to co-bond the components 13, 15 to padup strip 11.

An alternative method of assembly using z-pins is disclosed in U.S. Pat. Nos. 5,876,540, 5,876,832, 5,935,698 to Pannell and is shown in FIG. 2. A pre-cured strip 21 is formed of a plurality of plies of fibers and a resin matrix, a plurality of z-pins 23 extending from opposite sides of strip 21. Components 25, 27 are also formed of composites and may be cured or partially cured. To assemble partially cured components 25, 27, strip 21 is positioned between components 25, 27, then z-pins 23 are inserted into adjacent surfaces 29, 31. The resin in components 25, 27 is cured to co-bond surfaces 29, 31 and to retain z-pins 23 within components 25, 27. Alternatively, if components 25, 27 are pre-cured, padup strips 33 are used between strip 21 and surfaces 29, 31. Padup strips 33, like padup strip 11 in FIG. 1, are typically formed of the same materials as components 25, 27 or formed of a pure adhesive material without fiber reinforcement.

A need exists for an improved method that reduces the steps in assembly and provides for a strong joint when joining components using a woven preform. A further need exists for a method of joining components in a structural joint that provides for a larger dimensional tolerance between components when using an adhesive at the bond line.

SUMMARY OF THE INVENTION

One embodiment of the present invention comprises a tapered tension bond joint that utilizes a system of composite and adhesive materials to provide for a high strength, producible closeout joint for high performance structures. The closeout joint is the last major step in assembling the structure. The system includes one skin that is co-bonded to flat panel, pre-cured spars. The tapered tension bond joint is positioned at the opposite side of the spars to provide the closeout joint. A woven preform is bonded to the other skin. The woven preform has an edge portion that mates and bonds with the edge portion of the spar. One of the edge portions is in the configuration of a V-shaped receptacle while the other is in the configuration of a wedge. Preferably, the spar provides a female receptacle or slot that is designed to receive a matching male blade from the closeout skin assembly. The male blade is co-cured with the lower skin.

In the preferred embodiment, the flat panel spars are designed with a series of imbedded nut elements in the receptacle that serve as "internal tooling" to provide a positive stop for locating the lower skin, as well as a means for clamping the lower skin to the upper assembly during the closeout operation. The blade has mating recesses to receive the nut elements. The disruption of the closeout joint by the imbedded nuts gives the final assembled structure a very significantly enhanced ballistics survivability. The nuts act to stop cracks formed in the structure when the structure is impacted. A very significant amount of tolerance is allowed for the fit between the blade and the slot, thereby reducing the cost associated with highly accurate 3-D joints.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figures 4, 5:
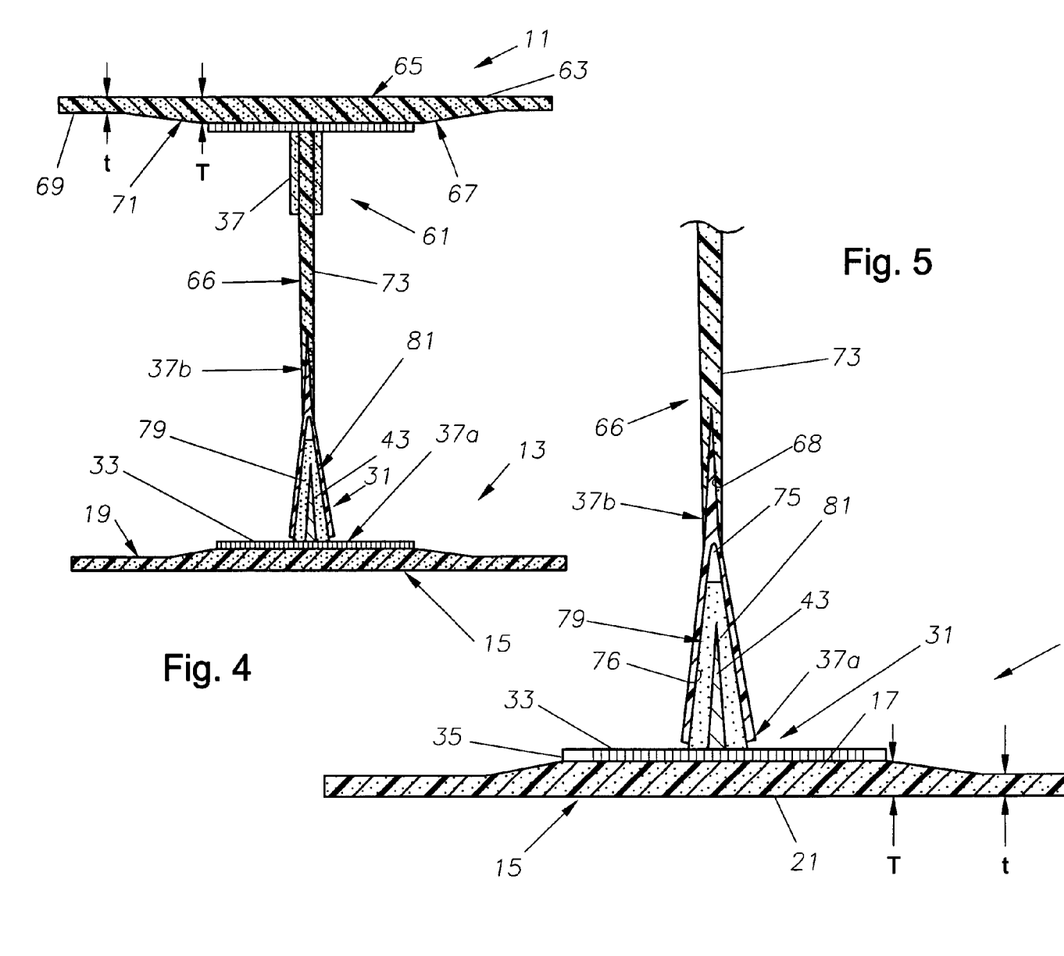
FIG. 4 is a sectional end view of the structure of FIG. 3 taken along the line 4—4 of FIG. 3 and is constructed in accordance with the present invention.
FIG. 5 is a sectional end view of the structure of FIG. 3 taken along the line 5—5 of FIG. 3 and is constructed in accordance with the present invention.

Referring to FIGS. 3 and 4, one embodiment of a structural assembly 11 constructed in accordance with the present invention is shown. In the embodiment shown, the structural assembly 11 includes a joint component, e.g., a closeout assembly 13 (FIG. 5). Closeout assembly 13 has a composite first structural member comprising an external surface 15 and a plurality of internal joint surfaces 17 located opposite the external surface 15. In one version, the external surface 15 is formed by a "closeout skin" comprising a co-bonded laminated composite. The closeout assembly 13 has nominal regions 19 and each of the internal joint surfaces 17 is located on a built-up region 21. The nominal regions 19 have a thickness "t" that is less than a thickness "T" of the built-up regions 21.

The closeout assembly 13 also includes a plurality of protrusions 31 (one shown in FIG. 5). Each of the protrusions 31 extends from a respective one of the internal joint surfaces 17. The protrusions 31 may be joined to the closeout assembly 13 with z-pins 33 extending through respective ones of the built-up regions 21. An adhesive 35 is located between and bonds respective ones of the protrusions 31 and the built-up regions 21.

Figure 9:
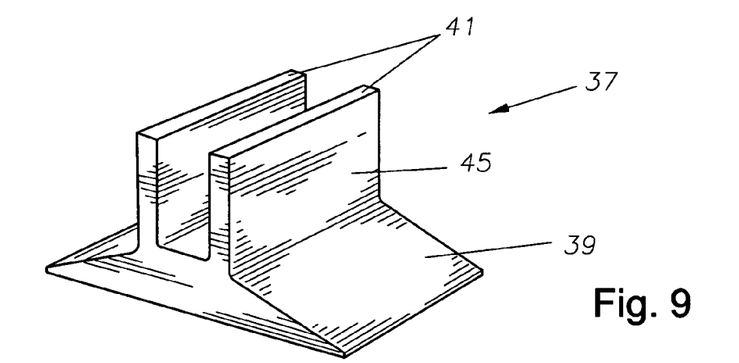
FIG. 9 is an isometric view of a preform used to form various portions of the structure of FIG. 3 and is constructed in accordance with the present invention.
Figure 10:
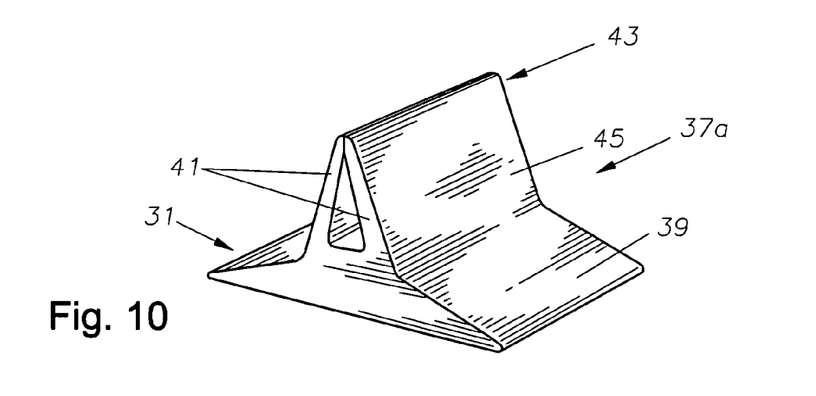
FIG. 10 is an isometric view of the preform of FIG. 3 that has been configured as a protrusion and is constructed in accordance with the present invention.

In one embodiment, each protrusion 31 comprises a pi-shaped preform 37 (FIG. 9) having a planar base 39 and a pair of legs 41 extending from the base 39. Prefroms 37 are woven from fibers having high tensile strength, such as aramid fibers. The weave is multi-layered to provide three dimensions, as illustrated in U.S. Pat. No. 6,712,099. Prior to curing, performs 37 are flexible and can be pre-impregated with resin to allow them to be flexed into and retained in various shapes. As shown in FIG. 10, the preform 37 is deformed into a preform 37a, such that the pair of legs 41 are inclined toward each other to form a wedge-like blade 43 having an elongated shape with outer surfaces 45. Preform 37a retains a substantially flat base 39. Alternately, preform 371 could be a T-shape, with a single leg that is shaped like a wedge forming the edge portion.

Each of the protrusions 31 also has a longitudinal profile (see FIG. 7), and a lateral cross-sectional shape (FIG. 5) that is transverse to the longitudinal profile. In addition, each protrusion 31 has a series of features or discontinuities 53 for accommodating a series of internal fasteners 51 (FIGS. 6 and 7), to be discussed subsequently.

Again referring to FIGS. 3 and 4, the structural assembly 11 also includes a base assembly 61 that is secured to the closeout assembly 13, described above. Base assembly 61 has an external portion 63 or second structural member, and a plurality of composite spar webs 66 extending from the external portion 63. Like closeout assembly 13, the external portion 63 has a plurality of internal joint surfaces 67 located opposite an external surface 65. In one version, the external surface 65 is formed by a co-bonded laminated composite skin. The external portion 63 also has nominal regions 69 and each of the internal joint surfaces 67 is located on a built-up region 71. The nominal regions 69 have a thickness "t" that is less than a thickness "T" of the built-up regions 71.

In the embodiment shown, each of the spar webs 66 includes an unaltered preform 37 (FIG. 9) having a base 39 and a pair of legs 41 extending from the base 39, as described above. The unaltered preforms 37 are joined to the external portion 63 in the same manner that protrusions 31 are joined to the first structural member. Spar web 66 comprises a wall 73 that is joined to and extends from preform 37 from between legs 41.

Figure 6:
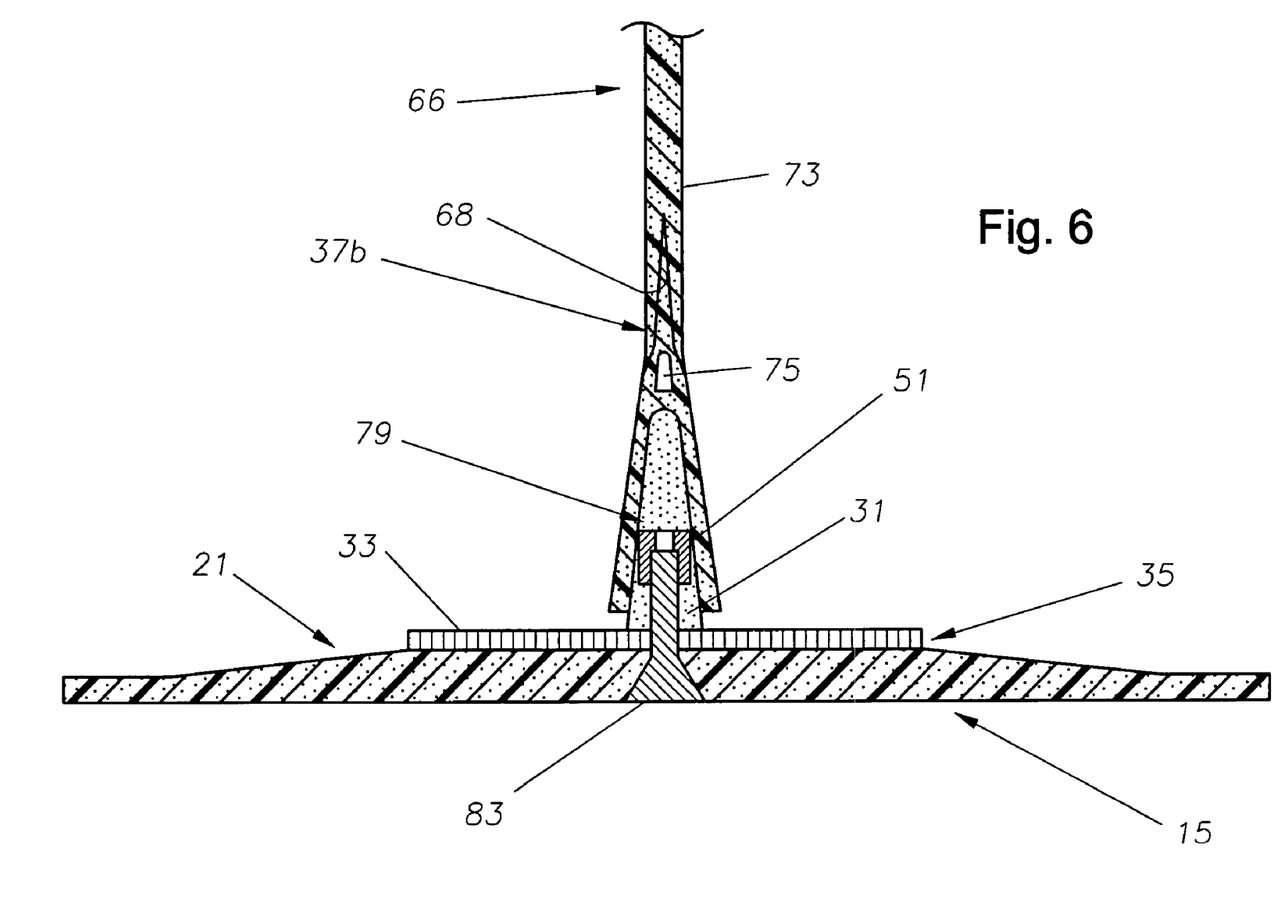
FIG. 6 is a sectional end view of the structure of FIG. 3 taken along the line 6—6 of FIG. 3 and is constructed in accordance with the present invention.
Figure 8:
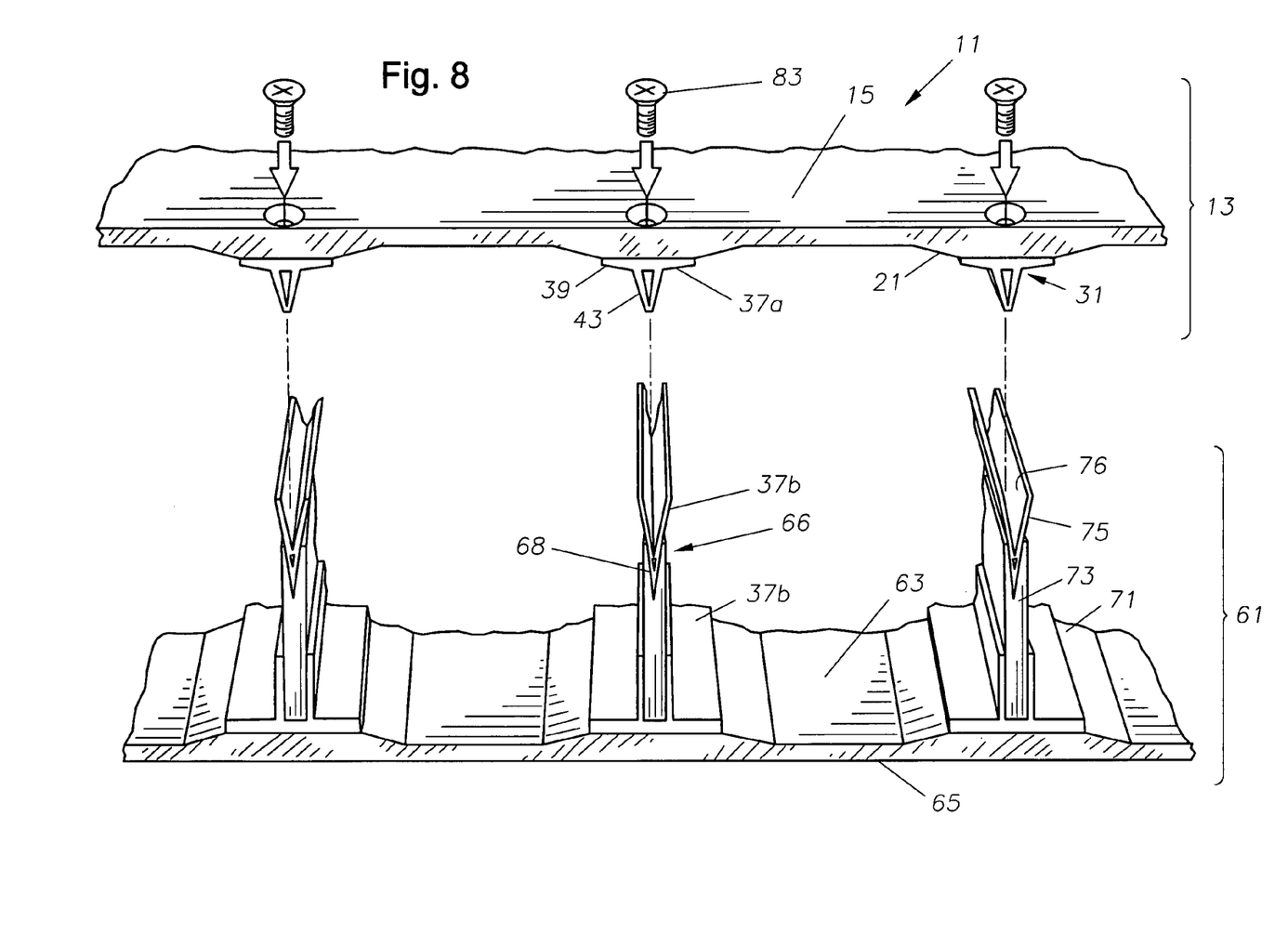
FIG. 8 is an exploded end view of the structure of FIG. 3 prior to final assembly, with the internal fasteners not shown.
Figure 11:
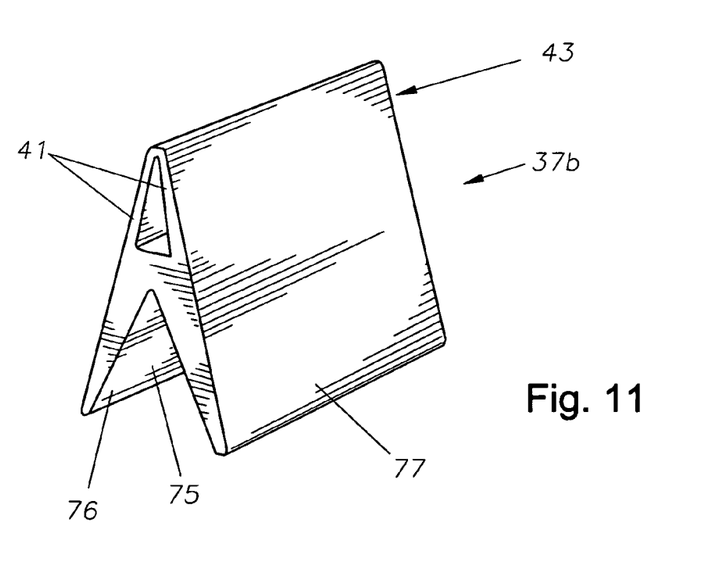
FIG. 11 is an isometric view of the preform of FIG. 3 that has been configured as a receptacle for a spar web and is constructed in accordance with the present invention.

Spar web 66 has an edge that is split to define a V-shaped trough 68 (FIGS. 6 and 8). Another preform 37b, is configured in the shape of an A-frame, as shown in FIG. 11. Preform 37b has a tapered portion formed by legs 41 that converge to form a wedge or blade 43 that fits and bonds into trough 67 (FIGS. 6 and 8). On the opposite edge, lateral sides 77 diverge to create a V-shaped spar receptacle 75. Legs 41 are inclined toward and join each other to form a wedge-shaped blade 43, and are located inside a respective one of the spar web walls 73. Spar receptacle 75 has—internal surfaces 76 that mate with blade 43 of preform 37a.

Figure 7:
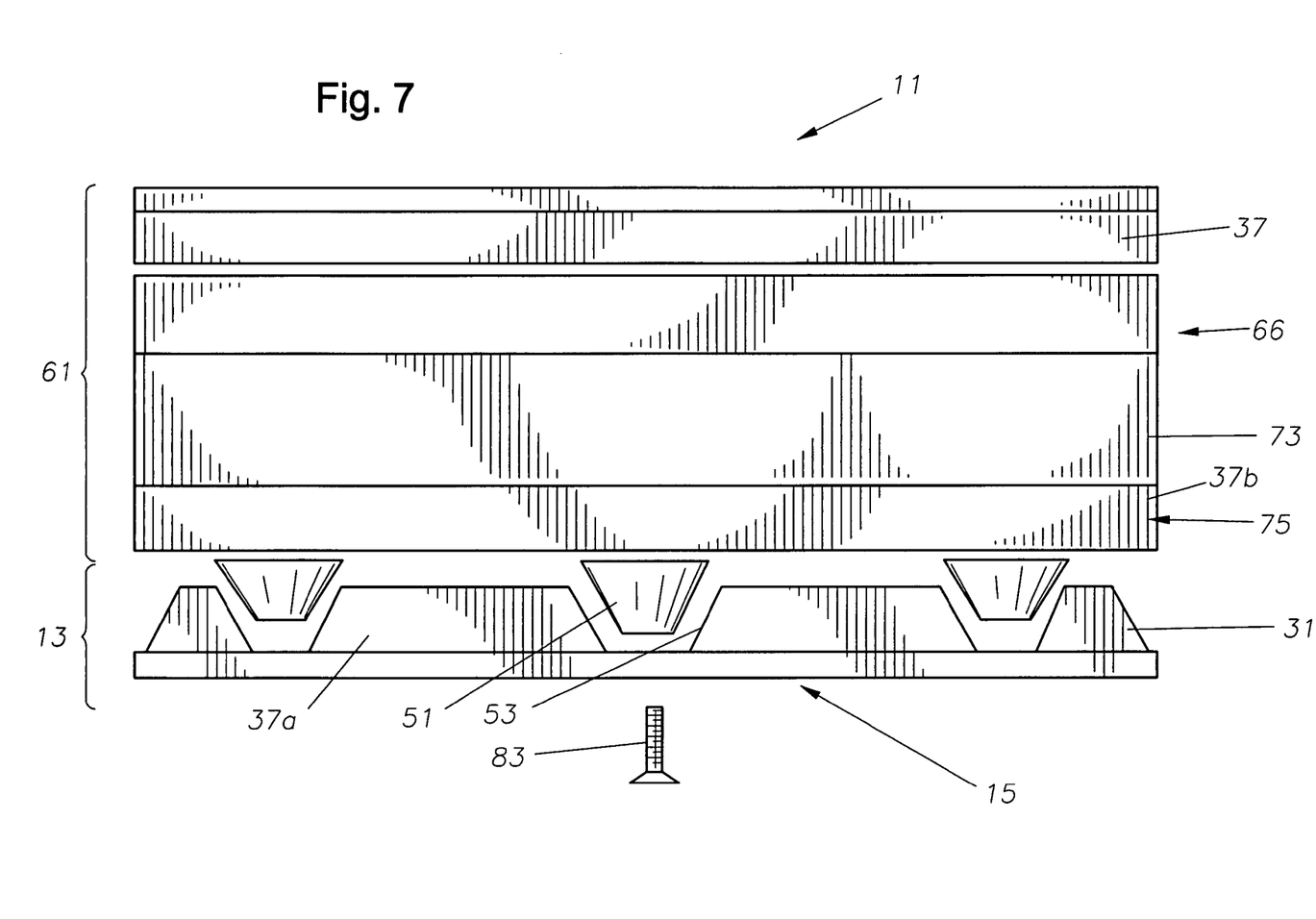
FIG. 7 is an exploded side view of the structure of FIG. 3 and is constructed in accordance with the present invention.

A series of internal fasteners 51 are adhesively bonded to inner surfaces 76 of each spar receptacle 75, as illustrated in FIG. 6. The cross-sectional shapes of internal fasteners 51 and spar receptacles 75 (FIG. 6) are complementary. Each of the internal fasteners 51 locates within one of the recesses or discontinuities 53 (FIG. 7) and has a profile (e.g., trapezoidal) that is substantially complementary to said one of the discontinuities 53. FIG. 7 shows internal fasteners 51 removed from spar receptacle 75 for illustration purposes, but in the method of assembly, fasteners 51 are initially bonded inside spar receptacles 75. Inside surfaces 76 of each of the spar receptacles 75 are adhesively joined to respective ones of the protrusions 31 with an adhesive 79. An embedded filler 81 may also used as needed between the spar receptacles 75 and protrusions 31/fasteners 51. When assembled the outer surfaces 45 of the blades 43 of protrusions 31 abut respective ones of the inner surfaces 76 to define interfaces that are wet by the adhesive 79. In this way, the spar webs 75 are substantially perpendicular to both external skins of the structural assembly 11.

The structural assembly 11 also includes a plurality of external fasteners 83 that extend through the external surface 15 of the closeout assembly 13. External fasteners 83 are connected to the internal fasteners 51 (FIG. 6) such that the external fasteners 83 are substantially flush with the external surface 15 of the closeout assembly 13. In one embodiment of the present invention, the external fasteners 83 comprise countersunk assembly pull-up or closeout fasteners, and may be adhesively bonded to the rest of the assembly when installed.

The present invention also comprises a method of forming the structure 11. Referring to FIGS. 4 and 5, the method comprises fabricating the closeout assembly 13 with a plurality of protrusions 31, which are woven performs 37a. The skin or structural member 15 and performs 37a are bonded to each other and cured separately from the opposite skin or structural member 63. Legs 43 of performs 37a converge toward each other to form a wedge-shaped blade.

The method also includes providing the base assembly 61 with a plurality of the spar webs 66 extending from the external portion 63. Spar webs 66 are bonded to structural member or skin 63 by woven performs 37 in the preferred embodiment. Each of the spar webs 66 has a V-shaped spar receptacle 75 joined to it that is complementary in shape to the blade 43 of a respective one of the performs 37a. Internal fasteners 51 are bonded to inner surfaces 76 of spar receptacles 75. The various components of base assembly 61, including spar webs 66, spar receptacles 75 and fasteners 51, are assembled and cured prior to joining closeout assembly 13, as illustrated in FIG. 8.

Then adhesive 79 (FIG. 6) is placed in spar receptacles 75 and on blades 43 of preforms 37a, and closeout assembly 13 and base assembly 61 are brought together. Spar receptacles 75 slide over blades 43 of performs 37a and internal fasteners 51 locate within discontinuities 53 (FIG. 7). External fasteners 83 are extended through the closeout assembly 13 and connected to respective ones of the internal fasteners 51 such that the external fasteners 83 are, in one embodiment, substantially flush with the external surface 15 of the closeout assembly 13. Tightening fasteners 83 draws spar receptacles and the entire closeout assembly 13 tightly into engagement with base assembly 61. Adhesive 79 then cures to retain the assemblies 13, 61 together.

The tapered tension bond joint of the present invention has several advantages including the use of a system of composite and adhesive materials to provide a high strength, producible closeout joint for high performance structures. The system uses woven preform construction for mating parts, and a single part paste adhesive bonding material. The resultant tapered, secondarily bonded tension joint is typically stronger than the adjacent structure. The imbedded nuts serve as "internal tooling" to provide a positive stop for locating the lower skin, as well as a means for clamping the lower skin to the upper assembly during the closeout operation. The disruption of the blade of the closeout joint by the imbedded nuts gives the final assembled structure a significantly enhanced ballistics survivability when impacted. Moreover, a very significant amount of tolerance is allowed for the fit between the blade and the slot, thereby reducing the cost associated with highly accurate 3-D joints. This "de-toleranced" design enables the ability of the mating joint to be effective for large differences in male to female joint interface location.

Additional advantages of the present invention include excellent high strength, especially with regard to high strain rates, hydrodynamic load attenuation, and ballistics survivability, thereby reducing the risk of catastrophic damage to the structure. The improvements of the present invention over the prior art provide an optimal load path for passing major shear loads through the center of the joint to the skin of the structure. The present design also significantly reduces the parts and fasteners required to complete construction, which greatly reduces the tooling requirements, assembly time, and cost for assembly.

While the invention has been shown or described in only some of its forms, it should be apparent to those skilled in the art that it is not so limited, but is susceptible to various changes without departing from the scope of the invention. For example, internal and external fasteners 51, 83 and discontinuities could be eliminated in some cases. Adhesive 79 provides sufficient strength to bond spar receptacle 75 to blade 43 of preform 37a in those instances. While adhesive 79 is curing, closout assembly 13 and base assembly 61 could be held together by other means.

The invention claimed is:

1. A structural assembly, comprising:

a first structural member having a surface and a joint surface located opposite the surface;

a joint component having a base and a protrusion extending from the base, the base being mounted to and integrated with the joint surface of the first structural member, the protrusion having a longitudinal profile, a lateral cross-sectional shape that is transverse to the longitudinal profile, and a series of features formed in the protrusion, the features being spaced apart from each other along the longitudinal profile;

a plurality of internal fasteners, each of which is located in one of the features of the protrusion, each of the internal fasteners having a profile that is substantially complementary to a respective one of the features in the protrusion, and a cross-sectional shape that is substantially consistent with the lateral cross-sectional shape of the protrusion such that the internal fasteners are integrated into the protrusion;

a second structural member having a receptacle formed therein, the receptacle being complementary in shape to the protrusion and the internal fasteners along the longitudinal profile for receiving the protrusion and the internal fasteners, and the receptacle being joined to the protrusion and the internal fasteners with an adhesive; and a plurality of external fasteners extending through the first structural member and connected to the internal fasteners such that the external fasteners are substantially flush with the surface of the first structural member.

2. The structural assembly of claim 1, wherein both the joint component and the receptacle of the second structural member are preforms having a base and a pair of legs extending from the base.

3. The structural assembly of claim 1, wherein the joint component is a preform and comprises a planar base and a pair of legs extending from the base, the pair of legs being inclined toward each other to form a wedge-like shape for the protrusion.

4. The structural assembly of claim 1, wherein the second structural member is a spar web and the receptacle comprises a preform having a base with two lateral sides and a pair of legs extending from the base between the two lateral sides, the pair of legs being inclined toward each other and located inside the spar web, and the two lateral sides being folded away from the pair of legs to form the receptacle as a trough having a Y-shaped lateral cross-section.

5. The structural assembly of claim 1, further comprising an embedded filler located between the receptacle and the protrusion.

6. The structural assembly of claim 1, wherein the protrusion is a blade having an elongated wedge-like shape with outer surfaces, and the receptacle is a trough having a tapered Y-shaped cross-section with inner surfaces, and wherein the outer surfaces abut the inner surfaces to define an interface that is wet by the adhesive.

7. The structural assembly of claim 1, wherein the first structural member is a closeout skin formed from a laminated composite, and the second structural member is a spar web that is substantially perpendicular to the closeout skin.

8. The structural assembly of claim 1, wherein the first structural member has a nominal region and the joint surface is located on a built-up region, such that the nominal region has a thickness that is less than a thickness of the built-up region.

9. The structural assembly of claim 8, wherein the joint component is joined to the first structural member with z-pins extending through the built-up region into the base of the joint component, and an adhesive is located between and bonds the base of the joint component and the built-up region.

10. The structural assembly of claim 1, wherein the internal fasteners are adhesively bonded to the receptacles.

11. A structural assembly, comprising in combination:
a closeout assembly having an external surface, a plurality of internal joint surfaces located opposite the external surface, and a plurality of protrusions, each of which extends from one of the internal joint surfaces, each of the protrusions having a longitudinal profile, a lateral cross-sectional shape that is transverse to the longitudinal profile, and a series of internal fasteners integrated into each of the protrusions such that the internal fasteners in each series of internal fasteners are spaced apart from each other along respective ones of the longitudinal profiles;
a base assembly having an external portion and a plurality of spar webs extending from the external portion, each of the spar webs having a spar receptacle, and each of the spar receptacles being complementary in shape to a respective one of the protrusions and said each series of internal fasteners along a respective one of the longitudinal profiles for receiving said respective one of the protrusions and said each series of internal fasteners, and each of the spar receptacles being joined to said respective one of the protrusions and said each series of internal fasteners with an adhesive; and
a plurality of external fasteners extending through the closeout assembly and connected to the internal fasteners such that the external fasteners are substantially flush with the external surface of the closeout assembly.

12. The structural assembly of claim 11, wherein each of the protrusions has a series of discontinuities, and each of the internal fasteners is mounted in one of the discontinuities and has a profile that is substantially complementary to said one of the discontinuities, and a cross-sectional shape that is substantially consistent with the lateral cross-sectional shape of said respective one of the protrusions such that the internal fasteners are integrated into the protrusions.

13. The structural assembly of claim 11, wherein each of protrusions comprises a preform having a planar base and a pair of legs extending from the base, the pair of legs being inclined toward each other to form a wedge-like blade.

14. The structural assembly of claim 11, wherein each of the spar receptacles comprises a preform having a base with two lateral sides and a pair of legs extending from the base between the two lateral sides, the pair of legs being inclined toward each other and located inside a respective one of the spar webs, and the two lateral sides being folded away from the pair of legs to form the spar receptacle as a trough having a Y-shaped lateral cross-section.

15. The structural assembly of claim 11, further comprising an embedded filler located between each of the spar receptacles and respective ones of the protrusions.

16. The structural assembly of claim 11, wherein each of the protrusions is a blade having an elongated wedge-like shape with outer surfaces, and each of the spar receptacles is a trough having a tapered Y-shaped cross-section with inner surfaces, and wherein respective ones of the outer surfaces abut respective ones of the inner surfaces to define interfaces that are wet by the adhesive.

17. The structural assembly of claim 11, wherein the closeout assembly includes a laminated composite skin, and the spar webs are substantially perpendicular to both the laminated composite skin and the external portion.

18. The structural assembly of claim 11, wherein the closeout assembly has nominal regions and each of the internal joint surfaces is located on a built-up region, such that the nominal regions have a thickness that is less than a thickness of the built-up regions.

19. The structural assembly of claim 18, wherein the protrusions are joined to the closeout assembly with z-pins extending through respective ones of the built-up regions, and an adhesive is located between and bonds respective ones of the protrusions and the built-up regions.

20. The structural assembly of claim 11, wherein the internal fasteners are adhesively bonded to respective ones of the protrusions, and the external fasteners are assembly pull-up fasteners.

21. A structural assembly, comprising:
first and second structural members having interior surfaces facing each other;
a spar extending longitudinally along the interior surface of the first structural member, the spar having an edge portion spaced from the interior surface of the first structural member;
a second structural member woven preform bonded to the interior surface of the second structural member and having an edge portion spaced from the interior surface of the second structural member;
one of the edge portions comprising a wedge member and the other of the edge portions comprising a V-shaped receptacle that matingly receives the wedge member, the wedge member and the receptacle being bonded to each other to secure the first and second structural members to each other; wherein:

the spar comprises a composite member of fiber and resin having a V-shaped trough formed therein; and the edge portion of the spar comprises a spar woven preform that has a wedge-shaped base that mates with and is bonded to the trough.

22. A structural assembly, comprising:

first and second structural members having interior surfaces facing each other;

a spar of composite material bonded to and extending longitudinally along the interior surface of the first structural member;

a spar woven preform bonded to an edge of the spar and having legs defining a V-shaped receptacle;

a second structural member woven preform having a base bonded to the interior surface of the second structural member and having a protruding wedge portion that is inserted into and bonded to the receptacle.

23. The structural assembly according to claim 22, wherein:

the edge of the spar defines a V-shaped trough; and the spar woven preform has a wedge-shaped base that fits within and is bonded to the trough.

* * * * *